United States Patent [19]

Cook et al.

[11] Patent Number: 5,629,998
[45] Date of Patent: May 13, 1997

[54] METHOD AND APPARATUS FOR WRITING PHOTOSENSITIVE GRATING USING LLOYD'S MIRROR

[75] Inventors: Thomas A. Cook, Corning; Robert A. Modavis, Painted Post, both of N.Y.

[73] Assignee: Corning Incorporated, Corning, N.Y.

[21] Appl. No.: 593,637

[22] Filed: Jan. 29, 1996

[51] Int. Cl.$^6$ .................. G02B 6/34; C03B 37/023
[52] U.S. Cl. .................. 385/37; 385/31; 385/51; 385/123; 385/147; 65/385; 65/425; 65/441
[58] Field of Search .................. 385/31, 37, 39, 385/51, 123, 147; 65/385, 425, 441

[56] References Cited

U.S. PATENT DOCUMENTS

| | | | |
|---|---|---|---|
| 4,632,553 | 12/1986 | Vidrine et al. | 356/346 |
| 4,859,548 | 8/1989 | Heise et al. | 430/1 |
| 5,042,897 | 8/1991 | Meltz et al. | 385/37 |
| 5,218,651 | 6/1993 | Faco et al. | 385/4 |
| 5,307,437 | 4/1994 | Facq et al. | 385/124 |
| 5,309,260 | 5/1994 | Mizrahi et al. | 359/3 |
| 5,377,288 | 12/1994 | Kashyap et al. | 385/37 |
| 5,388,173 | 2/1995 | Glenn | 385/37 |
| 5,430,817 | 7/1995 | Vengsarkar | 385/37 |
| 5,457,760 | 10/1995 | Mizrahi | 385/37 |
| 5,502,786 | 3/1996 | Inniss et al. | 385/123 |
| 5,528,716 | 6/1996 | Inniss et al. | 385/123 |
| 5,559,907 | 9/1996 | Inniss et al. | 385/11 |

FOREIGN PATENT DOCUMENTS

| | | | |
|---|---|---|---|
| 166291A1 | of 0000 | European Pat. Off. | 385/37 |
| 2731645A1 | of 0000 | Germany | 385/37 |
| 145512A1 | of 0000 | Japan | 385/37 |

*Primary Examiner*—Brian Healy
*Attorney, Agent, or Firm*—Cumpston & Shaw; William Greener

[57] ABSTRACT

Apparatus for forming a refractive index grating in a waveguide in accordance with the invention includes a waveguide formed from a material that changes its index of refraction when exposed to a beam of optical radiation, a source of coherent optical radiation for forming a beam of radiation, a mirror arranged to intercept a first part of a beam and to reflect the first part of the beam through an angle, and a phase delay plate arranged to intercept a second part of the beam for delaying the second part of the beam propagating through the plate, in which the mirror and the phase delay plate are arranged so that the first part of the beam and the second delayed part of the beam form an interference pattern on the waveguide for changing the index of refraction of the waveguide, in a pattern corresponding to the interference pattern for forming an index grating in the waveguide.

10 Claims, 1 Drawing Sheet

METHOD AND APPARATUS FOR WRITING PHOTOSENSITIVE GRATING USING LLOYD'S MIRROR

BACKGROUND OF THE INVENTION

This invention relates generally to a method and apparatus for forming Bragg refractive index gratings in a waveguide, and more particularly to a method for forming such gratings using Lloyd's mirror, together with a phase delay plate for shifting the location of the grating away from the interface between the mirror and the waveguide for producing a longer, preferably symmetrical grating.

Optical waveguides, both fiber waveguides and planar waveguides have become increasingly important for a number of applications, including communications. A number of devices for providing specific functions in waveguides are best performed by waveguides that include optical waveguide gratings, more particularly refractive index gratings within the core of the waveguide. One approach to making optical waveguide gratings is to form an interference pattern from two interfering beams derived from a single frequency laser, which, if sufficiently intense, write a refractive index grating into the waveguide core over a period of time. The formation of a Bragg grating in this manner is known.

Bragg gratings can be formed that are either persistent or transient, that is gratings which are substantially permanently formed in the core and which persist after the grating forming radiation is removed, or gratings which persist only as long as the grating forming radiation is incident on the core, as described for example, by Faco et al. in U.S. Pat. No. 5,218,651.

In order to form a high quality grating, long coherence length optical sources have been required to reduce the formation of side lobes in the loss spectrum of filters created in the fiber. Long coherence sources are available, such as dye lasers and the like, but they are expensive, not particularly rugged, difficult to tune and keep in tune, and are generally unsatisfactory for use in a manufacturing environment.

Excimer lasers, which are superior for manufacturing operations, by virtue of their cost, ruggedness, stability and the like and which are suitable for writing gratings when used with a phase mask, have a shorter coherence length than dye lasers and have not been satisfactory for forming Bragg gratings in waveguides for this reason.

It is an object of this invention to provide a method and apparatus for forming a refractive index grating in a waveguide that overcomes the disadvantages of known methods and apparatus, and particularly a method and apparatus that allows the use of short coherence length optical sources in a modified Lloyd's mirror method that is particularly well suited to manufacturing environments.

Briefly stated, and in accordance with a presently preferred embodiment of the invention a method for forming a refractive index grating in a waveguide includes the steps of positioning the waveguide against tile edge of a mirror, directing a first portion of a coherent beam of optical radiation on the mirror at a first angle, and a second portion of the coherent beam of optical radiation on an optical phase delay plate, and combining the first and second portions in an interfering beam and directing the interfering beam on the waveguide to form a grating in the waveguide.

In accordance with another embodiment of the invention, the optical phase delay plate comprises a silica plate for delaying the second portion of the beam by an amount sufficient to shift the interference pattern away from the edge of tile mirror.

In accordance with still another aspect of the invention, the interference pattern is shifted sufficiently away from the edge of the mirror to form a symmetrical grating in the waveguide.

Apparatus for forming a refractive index grating in a waveguide in accordance with the invention includes a waveguide formed from a material that changes its index of refraction when exposed to a beam of optical radiation, a source of coherent optical radiation for forming a beam of radiation a mirror arranged to intercept a first part of a beam and to reflect the first part of tile beam through an angle, and a phase delay plate arranged to intercept a second part of the beam for delaying the second part of the beam propagating through the plate in which the mirror and the phase delay plate are arranged so that the first part of the beam and the second delayed part of the beam form an interference pattern on the waveguide for changing the index of refraction of the waveguide, in a pattern corresponding to the interference pattern for forming an index grating in the waveguide.

In accordance with another aspect of the invention, the mirror and the phase delay plate are arranged for forming a symmetrical pattern in the waveguide having its center shifted away from the line of intersection of the waveguide and the mirror.

BRIEF DESCRIPTION OF THE DRAWING

While the novel aspects of the invention are described with particularity in the appended claims, the invention itself, together with further objects and advantages thereof may be more fully comprehended by reference to, the following detailed description of a presently preferred embodiment of the invention, taken in conjunction with the accompanying drawing, in which:

DETAILED DESCRIPTION OF THE PREFERRED EMBODIMENT

Figure 1:
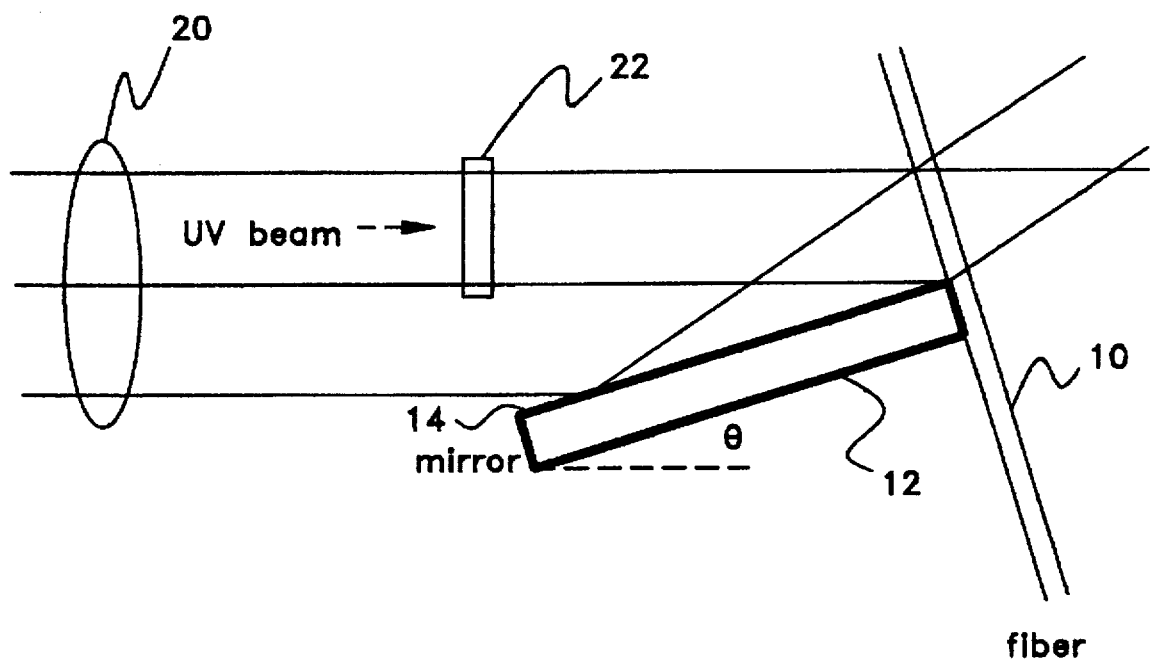
FIG. 1 is a diagram of apparatus for forming a refractive index grating in a waveguide in accordance with the invention.

Referring now to FIG. 1, a refractive index grating is formed in an optical fiber or planar waveguide 10. The waveguide is fixed to an edge of a mirror 12 and is oriented generally perpendicular to a first reflective surface 14 of mirror 12. A beam of preferably ultraviolet refractive index change inducing radiation 20, preferably radiation from an excimer laser is arranged so that a first portion of the beam is incident on the mirror, while a second portion is directly incident on the waveguide. Beams having a wavelength between about 193 and 514 nm. can be used. A preferably silica phase delay plate 22 is arranged so that only the second portion of tile incident beam passes through the plate. The plate has a thickness chosen to translate tile center of the interference pattern formed from the directly incident second portion of tile beam, and the reflected first portion of the beam longitudinally along the waveguide in a direction away from the line of intersection of tile waveguide and tile reflective surface of the mirror. The phase delay plate formed from silica having a thickness of about 1 mm. has been found to move the center of the Bragg grating about 1 mm. from the line of intersection of tile mirror and the waveguide, when the mirror is arranged at a half angle ob about 13 degrees.

By adjusting the half angle of the mirror with respect to the incident beam, the wavelength of light reflected by the grating (the Bragg wavelength) can be adjusted. The Bragg wavelength $\lambda_{Bragg}$ is given by:

$$\lambda_{Bragg} = N_{eff} \lambda_{write}/\sin\theta$$

where $N_{eff}$ is the effective index of the waveguide, and $\lambda_{write}$ is the wavelength of the ultra-violet beam. Half angles between about 10 and 15 degrees are preferred in accordance with the invention.

Preferably the waveguide, is either a planar waveguide or an optical fiber waveguide. Preferably, the waveguide core is sensitive to an incident beam for changing the refractive index of the core. For example, a germanosilicate silica clad fiber is sensitive to ultraviolet radiation in the 240 nm range for producing a sufficient index change to form a Bragg grating $GeO_2$ doping in the range of 5:12.5mol %. For example, 6.6% which is available commercially can be employed. Germania concentrations from less than 1% to almost 100% are useable in accordance with the invention. The length of the exposure necessary to form an effective grating depends upon the intensity of the radiation. An average power of approximately 4.5 milliwatts cart produce an effective Bragg grating when the core is exposed for about 20 minutes. Increasing the power to about 18.5 milliwatts can produce an even stronger grating in about five minutes.

Bragg gratings formed by this method are substantially permanent as long as the fiber is not heated excessively. Gratings formed in accordance with the method of this invention can withstand temperatures of up to 500° C., for many hours without substantial degradation.

Temporary or ephemeral strata can be formed in a waveguide having a core composed of a material which becomes light amplifying by optical pumping, and producing pumping waves generating within the core at least one variable interference field, the field including optical fringes created within the amplifying material of the core, strata extending over at least a part of the core of the latter. The interference field will be present only while, or as long as the pumping wave is present.

Forming a Bragg grating in a waveguide in accordance with this invention reduces the requirement for long temporal coherence imposed by the Lloyd's mirror method without the phase delay plate of this invention. The Lloyd's mirror arrangement essentially takes the ultraviolet wavefront and folds it on to itself to generate an interference pattern. Because the beam is folded on to itself, it must be spatially coherent over the length of the overlap between the first and second portions of the beam, in order to generate the desired interference pattern. For a source with low coherence, such as an excimer laser, which is desirable for reasons already discussed, the spatial coherence can be increased by expanding the beam exciting the laser. However, if the temporal coherence of the source is short, say a few hundred microns for an excimer laser, this can also limit the length of the grating.

By inserting the phase delay plate, such as a silica plate into the top portion of the beam, the position of zero time delay between the top and the bottom beams is shifted from the line of intersection of the waveguide and the mirror to a position higher up on the fiber. The thicker the silica plate, the higher up on the waveguide the position is moved. The addition of the phase delay plate in accordance with this invention increases the length of the grating by more than a factor of 2.

An additional advantage to the method and apparatus for forming a grating in accordance with this invention is that the grating formed is symmetrical, that is the center peak of the grating is translated longitudinally along the waveguide from the line of intersection between the waveguide and the mirror to a position longitudinally displaced along the fiber. If the longitudinal displacement is at least half the length of the grating produced, then the grating is symmetrical. Symmetrical gratings are desirable because they reduce side lobes in the transfer function of the grating.

In accordance with an exemplary embodiment of this invention, an SMF-28 fiber loaded with hydrogen at 100 atmospheres for more than seven days at room temperature can be exposed in accordance with this invention. The mirror is positioned at an angle of 13.5° to the incoming ultraviolet beam, and the beam has a wavelength of 240 nm. A phase delay plate having a thickness of 1 mm. can be positioned in the portion of the beam not reflected by the Lloyd's mirror.

After exposing the fiber for approximately 4 minutes, a grating will be formed having its center approximately 1 mm. from the line of intersection of the Lloyd's mirror and the fiber, and having a substantially symmetrical pattern of grating lines producing a large decrease in transmission near 1,478 nm.

While the invention has been described in connection with a presently preferred embodiment thereof, those skilled in the art will recognize that certain modifications and changes may be made therein without departing from the true spirit and scope of the invention, which accordingly is intended to be defined solely by the appended claims.

What is claimed is:

1. A method for forming a refractive index grating in a waveguide comprising the steps of:

positioning the waveguide against an edge of a mirror directing a first portion of a coherent beam of optical radiation on the mirror at a first angle, and a second portion of the coherent beam of optical radiation on an optical phase delay plate, combining the first and second portions in an interfering beam, and directing the interfering beam on the waveguide to form a grating in the waveguide.

2. The method of claim 1 in which the step of forming a grating in the waveguide comprises forming a permanent grating.

3. The method of claim 1 in which tile step of forming a grating in the waveguide comprises forming a temporary grating.

4. The method of claim 1 in which tile optical phase delay plate comprises a silica plate.

5. The method of claim 3 in which the silica plate comprises a plate for delaying a second portion of the beam by an amount sufficient to shift the interference pattern away from the edge of the mirror.

6. The method of claim 4 in which tile interference pattern is shifted sufficiently to form a symmetrical grating in the waveguide.

7. The method of claim 1 in which the waveguide comprises an optical fiber waveguide.

8. The method of claim 1 in which the waveguide comprises a planar waveguide.

9. Apparatus for forming a refractive index grating in a waveguide comprising:

a waveguide formed from a material that changes its index of refraction when exposed to a beam of optical radiation;

a source of coherent optical radiation for forming a beam of radiation;

a mirror arranged to intercept a first part of the beam and to reflect the first part of the beam through an angle $\phi$;

a phase delay plate arranged to intercept a second part of the beam for delaying the second part of the beam propagating through the plate;

the mirror and phase delay plate arranged so that the reflected first part of the beam and the delayed second part of the beam form an interference pattern on the waveguide for changing the index of refraction of the waveguide in a pattern for forming a refractive index grating.

10. The apparatus of claim 9 in which the mirror and the phase delay plate are arranged for forming a symmetrical pattern in the waveguide having its center shifted away from the line of intersection of the waveguide and the mirror.

* * * * *

UNITED STATES PATENT AND TRADEMARK OFFICE
CERTIFICATE OF CORRECTION

PATENT NO. : 5,629,998
DATED : May 13, 1997
INVENTOR(S) : Thomas A. Cook; Robert A. Modavis It is certified that error appears in the above-indentified patent and that said Letters Patent is hereby corrected as shown below:

Col. 1, Line 59, "tile" should be "the"
Col. 2, Line 3, "tile" should be "the"
Col. 2, Line 14, "tile" should be "the"
Col. 2, Line 54, "tile" should be "the"
Col. 2, Line 55, "tile" should be "the"
Col. 2, Line 57, "tile" should be "the"
Col. 2, Line 59, "tile" should be "the"
Col. 2, Line 59, "tile" should be "the"
Col. 2, Line 63, "tile" should be "the"
Col. 3, Line 22, "cart" should be "can"
Col. 4, Line 45, "tile" should be "the"
Col. 4, Line 48, "tile" should be "the"
Col. 4, Line 54, "tile" should be "the"

Signed and Sealed this

Twenty-ninth Day of July, 1997

Attest:

BRUCE LEHMAN

*Attesting Officer*       *Commissioner of Patents and Trademarks*